(12) United States Patent
Dall et al.

(10) Patent No.: US 11,037,304 B1
(45) Date of Patent: Jun. 15, 2021

(54) AUTOMATED DETECTION OF STATIC CONTENT WITHIN PORTIONS OF MEDIA CONTENT

(71) Applicant: Amazon Technologies, Inc., Seattle, WA (US)

(72) Inventors: Ryan Barlow Dall, Los Angeles, CA (US); Hooman Mahyar, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 16/127,052

(22) Filed: Sep. 10, 2018

(51) Int. Cl.
*G06F 16/738* (2019.01)
*G06T 7/246* (2017.01)
*H04N 21/439* (2011.01)
*G06N 3/04* (2006.01)

(52) U.S. Cl.
CPC ............ *G06T 7/246* (2017.01); *G06F 16/738* (2019.01); *G06N 3/04* (2013.01); *H04N 21/4394* (2013.01)

(58) Field of Classification Search
None
See application file for complete search history.

(56) References Cited

U.S. PATENT DOCUMENTS

| | | | |
|---|---|---|---|
| 5,432,455 A * | 7/1995 | Blades | G01R 31/66 324/536 |
| 7,796,794 B2 * | 9/2010 | Beyrard | A61B 5/0091 382/128 |
| 8,014,575 B2 * | 9/2011 | Weiss | A61B 5/0263 382/128 |
| 8,023,758 B2 * | 9/2011 | Hung | G06T 3/4007 382/255 |
| 8,077,917 B2 * | 12/2011 | Forsgren | G01N 15/1475 382/103 |
| 8,374,388 B2 * | 2/2013 | Stolkin | G06K 9/66 382/103 |
| 9,116,995 B2 * | 8/2015 | Koperski | G06F 16/355 |
| 9,137,568 B2 | 9/2015 | Sinha et al. | |
| 9,961,403 B2 * | 5/2018 | Kritt | H04N 21/266 |
| 10,423,660 B1 * | 9/2019 | Heo | G06F 16/30 |
| 10,455,297 B1 * | 10/2019 | Mahyar | G10L 15/1815 |
| 10,671,854 B1 * | 6/2020 | Mahyar | H04N 21/23418 |
| 2007/0136275 A1 * | 6/2007 | Wan | G06F 16/355 |
| 2008/0235191 A1 * | 9/2008 | Dijk | G06F 16/9535 |

(Continued)

FOREIGN PATENT DOCUMENTS

WO    WO2013164817 A1    11/2013

OTHER PUBLICATIONS

Office Action for U.S. Appl. No. 16/052,483, dated Oct. 21, 2020, Mahyar, "Automated Detection of Repeated Content Within a Media Series", 10 pages.

*Primary Examiner* — Tahmina N Ansari
(74) *Attorney, Agent, or Firm* — Lee & Hayes, P.C.

(57) ABSTRACT

This disclosure is directed to systems and methods that automatically detects static content within a media item. While consuming a media item, such as a movie, a user might notice, unexpectedly, that a portion of the movie does not change resulting in a poor user experience. By dividing the media item into portions and analyzing the portions, the systems and methods described can automatically detect the static content and, in some instances, correct the static content.

20 Claims, 10 Drawing Sheets

(56) References Cited

U.S. PATENT DOCUMENTS

| | | |
|---|---|---|
| 2012/0019640 A1* | 1/2012 | Choudury .............. H04N 5/232 |
| | | 348/61 |
| 2012/0110043 A1 | 5/2012 | Cavet et al. |
| 2013/0031582 A1 | 1/2013 | Tinsman et al. |
| 2014/0071344 A1 | 3/2014 | Francisco |
| 2015/0195626 A1* | 7/2015 | Lee .................. H04N 21/41407 |
| | | 725/34 |
| 2018/0192101 A1 | 7/2018 | Bilobrov |

* cited by examiner

US 11,037,304 B1

AUTOMATED DETECTION OF STATIC CONTENT WITHIN PORTIONS OF MEDIA CONTENT

BACKGROUND

A user can consume a variety of media, such as television shows or movies, on a variety of devices and interfaces. While a user is consuming a media item, a user might notice static content. For instance, in the case of a video or slideshow, the playback might display a single image or a stuttering image for a duration of time. In the case of an audio recording, the playback might output a constant frequency or set of frequencies for a duration of time. This static content can result in a poor user experience.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
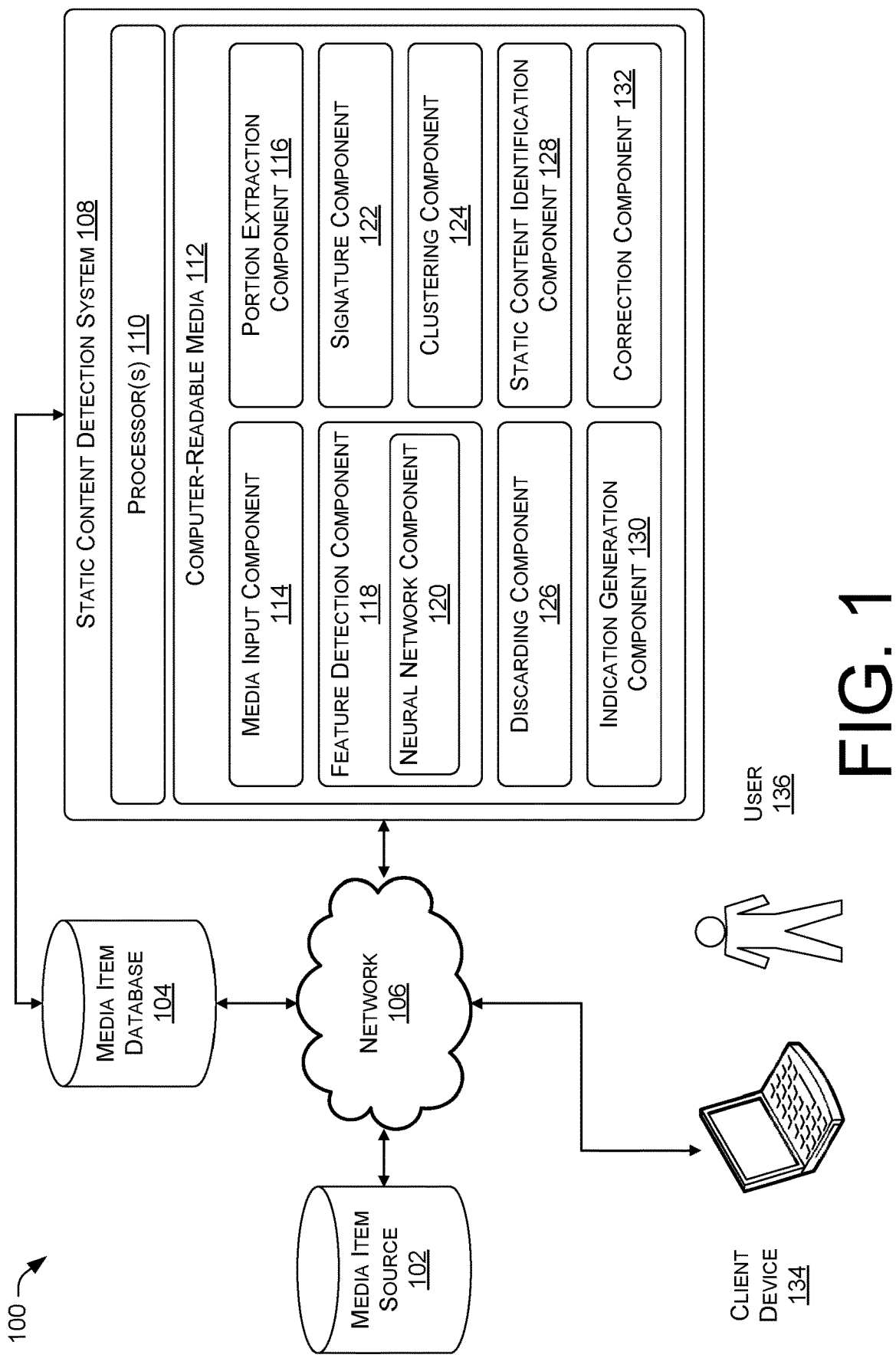
FIG. 1 is a system diagram of an illustrative environment that includes an illustrative computing architecture of a static content detection system.

Users can consume a media item through a variety of devices and interfaces. For example, a user can consume video on a mobile device, on a computer, or in a theater. Additionally, a user can consume audio recordings or slide shows on or through similar devices and/or interfaces. In some instances, an error can occur that causes the media item to output static, frozen, or stuttering content. For example, a video can show a single image or a stuttering image (e.g., switching between two or a set of images) for a duration of time, or an audio recording can output a single frequency or a switch to different frequencies within a set of frequencies.

To detect the static content in the media item, the techniques disclosed herein operate by determining or extracting, from the media item, media item portions. The media item can be a video. For example, a movie can be broken up into media item portions, such as individual frames. In some instances, a media item portion can comprise multiple frames. The media item can also be an audio recording. For example, a podcast can be broken up into media item portions where individual media item portions comprise audio for an amount/duration of time. The media item can also be a slide show, a set of images and/or photos, and/or a combination of video, audio, and/or photos. The media item portions can also vary in size. For example, when breaking up a movie, some media item portions can contain a single frame while other media item portions can contain multiple frames. In some instances, when breaking up an audio recording, some media item portions can contain 1 second of audio while other media item portions can contain 2 or more seconds of audio. Therefore, the media item portions can be broken up according to a fixed time interval or a variable time interval. In some instances, when breaking up a media item into media item portions, timestamp data can be extracted and/or determined and associated with the different media item portions.

A feature detection component can detect features from the media item portions. The features can comprise color data, audio frequency data, and/or text data. For example, a frame from a video can contain a person's face and/or other objects. In some instances, feature detection component can process the frame as a set of pixels where each pixel is associated with a numerical pixel value. By performing operations such as addition, subtraction, division, and/or multiplication among pixel values, the pixels can be correlated and associated with one another to detect the features. The feature detection component can use a neural network to detect the features. For example, an untrained or a trained deep neural network can be further trained to detect features or the feature detection component can use a neural network that has already been trained to detect the features.

After detecting the features, the features can be represented as a numerical value or a set of numerical values. For example, in the case of movie, a portion of the movie can be a single frame. That frame can include a car and a building. Consequently, after undergoing feature detection, the car and the building can be represented as a part of the numerical value or the sequence of numerical values associated with the frame. In some instances, in the case of an audio recording, such as a podcast, a portion of the audio recording can be, for example, a five second clip of the podcast. The five second clip can include features such as spoken words, music, a combination of spoken words and music, static, background noise, or silence. After undergoing feature detection, those features can be represented as a numerical value or a set of numerical values associated with the five second clip. In some instances, in the case of spoken words, the spoken words can be transcribed into text and the text can be associated with the portion of the audio recording.

A signature can be generated based on the features, or a numerical value, or a set of numerical values, associated with the features. For example, in the case of a movie, a portion of the movie (e.g., a frame) can contain a car and a building. The car can be represented as a first numerical value and the building can be represented as a second numerical value. Then the first numerical value and the second numerical value can be used to generate a signature that is associated with the frame. In some instances, the signature can comprise a concatenation of the first numerical value and the second numerical value. In other instances, the signature can comprise a matrix structure of the first numerical value and the second numerical values. Other suitable data structures, such as data arrays, data stacks, and data trees, can be used.

After detecting the features, the media portions can be compared with one another and clustered based on, for example, a similarity threshold or a variance threshold. The signatures can provide a form of data such that similar signatures indicate a similarity in features. For example, in the case of a movie, two frames of the frames of the movie can be visually similar and therefore have high similarity. Then the two frames can be clustered together (e.g., placed within or associated with the same cluster). In some instances, the frames can be arranged according to a particular order or a sequential order, such as according to a timestamp. After clustering the frames of the movie, some clusters can be discarded based on, for example, a cluster size threshold resulting in remaining clusters. In some instances, all, some, or none of the clusters can be discarded.

Using the remaining clusters, subclusters can be generated or created based on, for example, a gap threshold. For example, in the case of a movie, the gap threshold can be used to determine if a gap or space between frames of the movie is too large. If the gap between two frames meets or exceeds the gap threshold, then the two frames can be placed into separate subclusters. After generating the subclusters, some subclusters can be discarded based on, for example, a subcluster size threshold resulting in a remaining set of subclusters. In some instances, all, some, or none of the subclusters can be discarded.

Then, using the remaining subclusters, a static content identification component can detect the static content in the media items. For example, in the case of a movie, a remaining subcluster can contain or be associated with 10 frames of the movie. The static content identification component can determine that the remaining subcluster is associated with static content. In some instances, timestamps can be used to indicate a beginning and/or an end of the static content.

An indication generation component can generate an indication of the static content. For example, a user can consume a media item at a time at which the static content is identified. The indication generation component can generate an indication to the user indicating the static content. This can allow for the user to recognize that a media service provider recognizes a problem, that the media service provider is working on a potential solution, and/or that the media service provider recommends a potential solution. In some instances, a user can consume a media item prior to a time at which the static content is identified. The indication generation component can generate an indication to the user indicating an upcoming static content. In some instances, the indication can indicate a cause of the static content. For example, the cause can be an error in the media item. In some instances, the cause can be in a transmission of the media item (e.g., poor/no network connection, limited network bandwidth, etc.). In some instances, the cause can be in an application or device rendering or outputting the media item.

A correction component can correct or attempt to correct the static content. For example, the correction component can determine that an updated media item or an updated media item portion is available in a media item database. In some instances, the correction component can determine that the updated media item or the updated media item portion is available in a media item source associated with a content creator, a studio, a producer, a network, or a distributor. In some instances, the correction component does not determine that the updated media item or the updated media item portion is available. The correction component can request or access a database and/or source and retrieve or receive the updated media item or updated media item portion. Then, the correction component can correct the media item by replacing the media item with the updated media item or replacing the static content with the updated media item portion that does not include the static content.

FIG. 1 is a system diagram of an illustrative environment 100 that includes a media item source 102, a media item database 104, a network 106, and an illustrative computer architecture of a static content detection system 108. The media item source 102 can be associated with a content creator, a studio, a producer, a network, or a distributor associated with a media item or content. The media item database 104 can store media items including, but not limited to, videos (e.g., television shows/episodes, motion pictures/movies/films, and/or individually created content such as home videos or cell phone videos), audio recordings (e.g., podcasts, audiobooks, and/or voice recordings/memos), and/or photos. In some instances, the media items can be a part of a regularly occurring series such as a television series or a weekly podcast. In other instances, the media items can be a part of a non-regularly occurring series such as a set of motion pictures. Therefore, in some instances, the media item database 104 can be a video database that stores a video or videos.

As depicted in FIG. 1, the media item source 102 can connect, via a network 106, to the media item database 104. In some instances, the media item source 102 can connect directly to the media item database 104 without the use of a network 106. The media item source 102 can provide media items to the media item database 104 for storage. For example, the media item source 102 can provide a movie that is transmitted to the media item database 104, which stores a copy or a substantially similar version of the movie. The media item source 102 and the media item database can also be placed within one another. For example, a content creator can be a media item source 102 and also have a media item database 104 to store a media item or content. Therefore, when connecting to the media item source 102, the media item database 104 can also be available in the same connection. In some instances, the media item source 102 can connect directly to the static content detection system 108 without the use of a network 106.

The media item database 104 can connect, via the network 106, to the static content detection system 108. For example, the media item database 104 can transmit a media item to the static content detection system 108 through a network interface and through the network 106. The media item database 104 can also connect directly to the static content detection system 108. For example, the media item database 104 can have a data connection to the static content detection system that does not use a network, such as network 106. The static content detection system 108 can also be placed within the media item database 104 or vice versa. These examples show how a variety of architectures could be used to implement these systems.

The static content detection system 108 can be implemented in a distributed or non-distributed computing environment. For example, some of the components can be distributed across multiple computing platforms or all of the components can be consolidated onto a single computing platform. Additionally, some of the components can be duplicated and implemented in parallel.

The static content detection system 108 can include one or more processors 110 and one or more computer readable media 112 that stores various modules, applications, programs, or other data. The computer-readable media 112 can also include instructions, that when executed by the one or more processors 110, cause the one or more processors 110 to perform the operations described herein for the static content detection system 108. In some instances, the processor(s) 110 can include a central processing unit (CPU), a graphics processing unit (GPU), both a CPU and a GPU, or other processing units or components known in the art. Additionally, each of the processor(s) 110 can possess its own local memory, which also may store program modules, program data, and/or one or more operating systems.

The computer-readable media 112 can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. The computer-readable media 112 can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 112 can store a media input component 114, a portion extraction component 116, a feature detection component 118, a neural network component, 120, a signature component 122, a clustering component 124, a discarding component 126, a static content identification component 128, an indication generation component 130, and a correction component 132.

The media item source 102 or the media item database 104 can transmit a media item to the media input component 114 directly or via the network 106. For example, the media input component 114 can receive the media item. In some instances, the media input component 114 can determine which media item to retrieve and then the media input component 114 can retrieve the media item. In some instances, the static content detection system 108 can access the media item without the media input component 114, for example, by having the media item stored within the computer-readable media 112 or, for example, by having the static content detection system 108 operating within the media item database 104.

The portion extraction component 116 can extract media item portions from the media item. For example, a media item such as a video can be split and extracted into media item portions such as a plurality of frames. In some instances, a media item such as an audio recording can be extracted into media item portions such as audio clips. Extracting media item portions facilitates the process of detecting static content as static content is often a subset or a portion of the media item. For example, a video with 2,000 frames can display static content for 50 frames. Then, then video can be split into individual frames resulting in 2,000 media item portions or frames. After performing one implementation of the techniques described herein, the systems and methods can indicate the beginning and/or the end of the static content associated with the 50 frames. In some instances, the video can be split into media item portions of more than one frame. In some instances, a high level of granularity can be used while in other instances, a lower level of granularity can be used. The level of granularity can be based on, for example, the type of media item or system resources.

The portion extraction component 116 can use utilities to perform the portion extraction. For example, the portion extraction component 116 can use a utility such as FFmpeg. In some instances, other or additional utilities providing similar capabilities can be used. In some instances, the portion extraction component 112 can perform the portion extraction directly by implementing segmentation algorithms and techniques or custom algorithms.

The portion extraction component 116 can perform portion extraction on a variety of types of media. For example, the portions can include one or more frames of a video. In some instances, the portions can include audio clips of an audio recording such as a podcast. In some instances, the media item can include a mixed type (i.e., a media item including both video and audio), and the portion extraction component 116 can extract the video portion, the audio portion, or both from the media item and extract portions from the extracted video portion and/or the extracted audio portion. The portion extraction component 116 can also extract time data and associate a time with each of the media item portions. In some instances, the portion extraction component 116 can determine time data based on an extraction rate. For example, if media item portions are extracted at a rate of one frame per second of a video, the portion extraction component can determine that the fifth frame is associated with a fifth second of the video. The portion extraction component 116 can also adjust the size of the media item portion using, for example, a configuration setting. For example, a single media item portion can include a single frame of the video or multiple frames of the video. In some instances, a single media item portion can include a fraction of a second of audio or multiple seconds of audio. By adjusting the size of the media item portions, a performance of a computer can be improved by reducing an amount of data required for processing or the iterations required to process a media item. Therefore, a computing system can operate faster, more efficiently, and/or with more accuracy.

The size of the media item portions can also be based on the size or length of the media item or the type of media item. For example, the size of the media item portions can be smaller for a shorter video, or a shorter audio recording, in order to have more granularity. In some instances, the size of the media item portions can be smaller or larger regardless of the size or length of the media item. The size or length of the media item portions can change or adjust dynamically, based on a configuration, based on machine-learning algorithms, and/or based on metadata or indications associated with the media item. For example, a media item can be associated with metadata or a tag that indicates that certain parts or segments of the media item can be ignored. A performance of a computer can also be improved by dynamically adjusting the size of the media item portions. The dynamic adjustment can allow a computing system to operate more efficiently by processing fewer media item portions and/or more accurately by concentrating on regions of a media item more likely to contain static content or by ignoring segments of the media item.

The feature detection component 118 can detect a plurality of features from the media item portions. For example, features can include data such as color data, object data, audio frequency data, text data, and/or data indicating a correlation between pixels. In some instances, a media item portion can be a frame of a video and the frame can depict a color or a plurality of colors. For example, a color that meets or exceeds a color threshold can become a representative color of the color data. In some instances, a frame of a video can depict objects, such as a car or a building. Audio frequency data can include data associated with a media item portion. For example, an audio recording can be split into one or more media item portions and a media item portion can contain, for example, an audio clip. The audio clip can be represented as an audio frequency or a set of audio frequencies. Text data can comprise the text associated with a media item portion of a media item that has been transcribed. In some instances, the text data can comprise numerals. For example, the media item portion can contain spoken words where the spoken words can be transcribed into text. Then the text can be represented as a feature associated with that media item portion of the media item. In some instances, text data can comprise text and/or characters of a language that is displayed or shown visually on a media item portion of a video. Data indicating a correlation between pixels can comprise, for example, X and Y coordinates for a set of pixels and, in some instances, can be used to detect edges within an image.

The feature detection component 118 can use data representing features and represent the features as numerical values. For example, the numerical values can include numbers with a range of 0-4096. In some instances, the range can include larger and/or smaller numerical values. After detecting the features, the feature detection component 118 can associate the detected features with the media item portion. For example, the feature detection component 118 can cause an association between the detected features and the media item portion to be stored in a database, a data structure, etc. In some instances, the feature detection component 118 can transcribe audio recordings into text and generate or determine transcriptions, using, for example, one or more automated speech recognition (ASR) techniques. Then, feature detection component 118 can detect portions of the text as the features associated with the media item portions.

The feature detection component 118 can use machine learning algorithms, statistical algorithms, and/or probabilistic models. In some instances, the feature detection component can use a neural network component 120 to detect the features. The neural network component 120 can include a deep neural network to operate on the media item portions to detect the features. For example, neural networks such as Visual Geometry Group (i.e., VGG), Residual Network (i.e., ResNet), GoogleNet, Zeiler & Fergus Net (i.e., ZFNet), and AlexNet can be used, although other suitable neural networks are also contemplated. In some instances, the neural network component 120 can perform localization to determine a location of an object in an image and in other instances, the neural networks can perform classification to determine a type of object in the image. Through multiple layers of processing, such as convolutions layers, max pooling layers, and/or fully connected layers, the neural network can calculate a probability or a likelihood distribution for an object in a given image.

The neural network component 120 can be trained to detect features from the media item portions. The training, for example, can include applying optimization algorithms (e.g., Gradient Descent, Stochastic Gradient Descent, or Adam) to optimize weights applied to layers within the neural network. Known inputs can be used to assist the training process. For example, an image of a chair can be used to train the neural network and the weights can be adjusted based on the probabilities associated with the classifications output by the neural network.

The signature component 122 can generate a signature or a plurality/set of signatures based on the features detected by the feature detection component 118. As discussed above, the features can be represented as numerical values. Using these numerical values, a signature can be generated by using, in some instances, a concatenation of the numerical values of some or all of the features in a media item portion. In other instances, the signature can comprise a matrix or matrices of the numerical values while other suitable structures can be used such as data arrays, data stacks, and/or data trees. The signature generated by the signature component 122 can include a list of features or a concatenated set of features. In some instances, a sequence of numerical values can represent the signature. The signature component 122 can then associate the generated signature with the media item portion.

The clustering component 124 can use the signatures to compare media item portions and associate media item portions with similar signatures into a plurality of clusters. The clusters can provide an association of one or more media item portions based on a criterion or criteria. For example, media item portions that have (or are associated) with signatures that meet or exceed a similarity threshold (or fall below a variance threshold) can be placed within or associated with the same cluster. In some instances, the similarity threshold can be a visual similarity, an audio similarity, and/or a textual similarity. The clusters can then indicate static content based on the similarity threshold. In some instances, a media item portion can be associated with a cluster without any other media item portions, indicating that the media item portion is not associated with another media item portion that meets or exceeds a similarity threshold. The comparison can include using a nearest neighbor search such as, for example, k-nearest neighbor, approximate nearest neighbor algorithms, or exact nearest neighbor algorithms. In some instances, the clustering component 124 can normalize the signatures prior to comparison. In some instances, the clustering component 124 can use a cosine similarity function to determine a similarity between signatures. In other instances, the clustering component 124 can use a Euclidean distance and/or a Manhattan distance to determine a similarity between signatures. In some instances, the clustering component 124 can use a difference function to determine a delta or a difference of numerical values in the signature to determine a similarity between multiple signatures. The clustering component 124 can also use a combination of methods and assign a weight to the various methods to determine a similarity between signatures.

The discarding component 126 can discard, disassociate, and/or delete clusters based on, for example, a cluster size threshold to generate one or more remaining clusters. For purposes of illustration, media item can be a video that has 100 frames clustered into a set of clusters. Frames associated with the same clusters can indicate, for example, a visual similarity. If a cluster is associated with 50 frames of the 100 frames, then this cluster would likely indicate static content as displays similar or substantially similar content for a detectable portion of the video. In some instances, if a cluster is associated with 1 frame of the 100 frames, then that cluster would likely not indicate static content because it does not have a visual similarity (or meet or exceed a similarity threshold) with other frames and can be discarded. For further purposes of illustration, a media item can be split into 10 media item portions. The 10 media item portions can be placed into a cluster with 5 media item portions, a cluster with 4 media item portions, and a cluster with 1 media item portion. If the cluster size threshold is configured to be 2 media item portions, then the cluster with one media item portion is discarded. Therefore, the discarding component 126 would leave 2 remaining clusters: 1 cluster with 5 media item portions and 1 cluster with 4 media item portions. That is, clusters that include a number of media item portions that are less than the cluster size threshold are disregarded or discarded. In some instances, none of the clusters are discarded. In some instances, all of the clusters can be discarded. In some instances, the cluster size threshold is configured and/or dynamically adjusted while processing a media item. In some instances, the cluster size threshold can adjust based on a type of media item. Additionally, in some instances, the discarding component 126 can be bypassed.

The clustering component 124 can use remaining clusters to generate one or more subclusters based on, for example, a gap threshold. Similar to the discussion above, the subclusters can provide an association of one or more media item portions based on a criterion or criteria. For example, a cluster can have sequential frames and non-sequential frames of a video or gaps between sets of sequential frames. For purposes of illustration, a cluster can have frames corresponding to a sequence such as: 1-4, 6, 10-15, and 20. If the gap threshold is configured to be 3 frames, then frames 1-4 and 6 could be placed in a first subcluster, frames 10-15 could be placed in a second subcluster, and frame 20 could be placed in a third subcluster, where each of the three subclusters are associated with that cluster. In some instances, the gap threshold can be represented as an amount of time. In some instances, the subclusters can then indicate static content as they contain (or are associated with) media item portions that meet or exceed a similarity threshold that also have an adjacent or near adjacent media item portion based on a gap threshold.

The discarding component 126 can discard, disassociate, and/or delete subclusters based on a subcluster size threshold. For example, a video can have frames clustered into a set of subclusters. Similar to the discussion above, subclusters that have one frame would likely not indicate static content and can be discarded and result in remaining subclusters. For purposes of illustration, a media item can be a video where one subcluster is associated with 30 frames and a different subcluster is associated with 1 frame. The subcluster with 30 frames is associated with frames that have a similarity that meets or exceeds a similarity threshold and also have frames that have an adjacent or near adjacent frame. Therefore, in this example, the subcluster with 30 frames would likely indicate static content as it, when viewed, would display similar or substantially similar content over a sequential or substantially sequential period of time. The subcluster with one frame would not likely indicate static content as it, when viewed, would display a single frame and proceed to a different frame displaying, likely, different content. Therefore, in this example, the subcluster with one frame can be discarded. In some instances, none of the subclusters are discarded. In some instances, all of the subclusters can be discarded. In some instances, the subcluster size threshold is configured and/or dynamically adjusted while processing a media item. In some instances, the discarding component 126 can be bypassed for the subclusters.

The static content identification component 128 can use the remaining subclusters to identify static content. For example, the remaining subclusters will contain media item portions that are sequential or substantially sequential within the media item. The static content identification component 128 can then determine that the remaining subclusters contain media item portions that correspond to static content or substantially static content. In some instances, the static content identification component 128 can use timestamp data to indicate a beginning of the static content and/or the end of the static content. The static content identification component 128 can store the timestamp data in the computer-readable media 112 and/or other storage accessible by the static content detection system 108. In some instances, multiple subclusters can remain and the static content identification component 128 can identify multiple static contents. For example, a video can have a first static content portion near a beginning of the video and a second static content portion near the end of the video. The static content identification component 128 can determine two instances of static content within the media item.

The static content identification component 128 can also identify a type of error, and/or a cause or source of the error associated with the static content. For example, a type of error can be a content error that indicates that the content itself contains the static content and, in some instance, contains corrupt data. In this scenario, the content error may be that a portion of a video is frozen, static, or is stuttering. In some instances, a type of error can be a playback error that indicates that an application rendering or outputting the media item is at fault and/or is causing the static content. The playback error indicates that the application or device that is rendering the media item is causing the static content. In some instances, a type of error can be a transmission error that indicates that an error has occurred during a transmission of the media item that is causing the static content. The transmission error may be based on a lack of a network connection, insufficient network bandwidth, and so on.

The static content identification component 128 can detect static content at the media item source 102, for example, by operating at (or within) the media item source 102. In some instances, the static content identification component 128 can detect static content at the media item database 104, for example, by operating at (or within) the media item database 104. In some instances, the static content identification component 128 can operate at (or within) both the media item source 102 and at the media item database 104 and, for example, determine that the media item database 104 has a content error (e.g., a static content portion) with a media item that does not exist with the media item at the media item source 102. For example, a video at the media item database 104 can have a content error (e.g., a static content portion) while a copy or similar version of the video at the media item source 102 does not have the content error. Therefore, for this example, the static content detection system 108 can determine that the video at the media item database 104 as the content error and, in some instances, request or receive an update to replace or correct the video.

The static content identification component 128 can also operate at (or within), for example, a client device 134 associated with a user 136. In some instances, the static content identification component 128 can determine that the media item rendered or output at the client device 134 has the static content and can indicate, for example, a playback error. In some instances, the playback error can indicate an error with the client device 134, an application executing on the client device 134, and/or a transmission error.

For example, the static content identification component 128 can operate at (or within) both the client device 134 and the media item database 104 and/or the media item source 102. The static content identification component 128 can determine that a media item has a content error (e.g., a static content portion) at the client device 124 and that the media item at the media item database 104 and/or the media item source 102 does not have the content error. Therefore, for this example, this can indicate an error with or at the client device 134.

In some instances, the static content identification component 128 can determine that a media item does not have a content error (e.g., a static content portion) as the media item is being transmitted to the client device 134 (e.g., while data packets are sent to the client device 134) but determine that the content error does exist while the media item is buffering or being rendered/output by an application at the client device 134. This can, in some instances, indicate a playback error that is associated with an application.

In some instances, the static content identification component 134 can determine that a static content portion does not exist at the media item database 104 and/or the media item source 102 but can determine that a static content portion does exist as the media item is being transmitted to the client device 134. This can, in some instances, indicate a transmission error.

The indication generation component 130 can generate an indication on a user interface corresponding to the static content. For example, in some instances, as a user views a television episode, the indication generation component 130 can generate an indication (or notification) to the user that a static content will begin (e.g., in a buffer) or has begun. In some instances, the indication generation component 130 can generate an indication to the user to allow the user to skip the static content to resume at the end of the static content or near the end of the static content. In some instances, the indication can allow the user to pause the rendering or output of the media item or place a bookmark at the location of the static content. If the user activates the indication, for example by touching or clicking on (i.e., selecting) the indication, playback can continue at or near the end of the static content. In some instances, the indication generation component 130 can use the timestamp data from the static content identification component 128 to determine when to generate the indication to the user and/or when to continue playback. Further, in some instances, the indication generation component 130 can include an indication of a type of error to the user.

In some instances, the indication generation component 130 can automatically pause and/or place a bookmark at the location of the static content based on a configuration setting and/or allow a user to automatically return to a user menu. For example, while viewing a movie, the playback can reach a time at which the static content portion is identified, generate an indication for the user, place a bookmark at the location, and/or return to a menu allowing the user to select a different movie to view.

The correction component 132 can correct and/or replace the static content in the media item. For example, the correction component 132 can request and/or identify a new, different, or updated media item from the media item database 104 and/or the media item source 102. In some instances, the correction component 132 can request and/or identify a new, different, or updated media item portion from the media item database 104 and/or the media item source 102. After receiving the updated media item and/or the updated media item portion, the correction component 132 can replace the media item with the updated media item and/or replace the static content portion with the updated media item portion. In some instances, the correction can occur as a user 136 is receiving the media item on a client device 134 and/or as the user 136 is consuming the media item (e.g., when the user 136 is consuming the media item at a time at which the static content portion is identified or before a time at which the static content portion is identified).

In some instances, a user may prefer to consume content with all repeated content removed. The repeated content removal component 128 can remove the repeated content and generate a new media item available to a user. In other instances, the repeated content removal component can remove the repeated content from the existing media item.

The static content detection system 108 can use consumer data to detect static content. For example, the static content detection system 108 can collect consumer data (e.g., consumer feedback, and/or playback data) indicating static content in a media item. Using this consumer data, the static content detection system 108 can build a confidence level associated with a media item. In some instances, the static content detection system 108 can use the confidence level to prioritize detecting static content within a media item.

The static content detection system 108 can connect to a network 106. As discussed above, the static content detection system 108 can be a part of a larger system that provides additional computing resources such as, without limitation, a network interface controller. The network interface controller can interface with the network 106. In other instances, the static content detection system 108 can include functionality to interface with the network 106 directly.

Client device 134 shows an example of a device such as a laptop, desktop computer, tablet, phone, e-reader, network appliance, or other computing device that can connect to network 106 where a user 136 can consume a media item on the client device 134. While the user 136 is viewing a media item, for example via the client device 134, the user 136 can indicate a selection to bypass or skip the static content that has been previously identified within that media item. For instance, the user 134 can select a button or selectable user interface element (e.g., on a remote control) to skip/bypass the static content. As discussed above, in some instances, the user 136 can indicate that the media item contains static content to the static content detection system 108.

Figure 2:
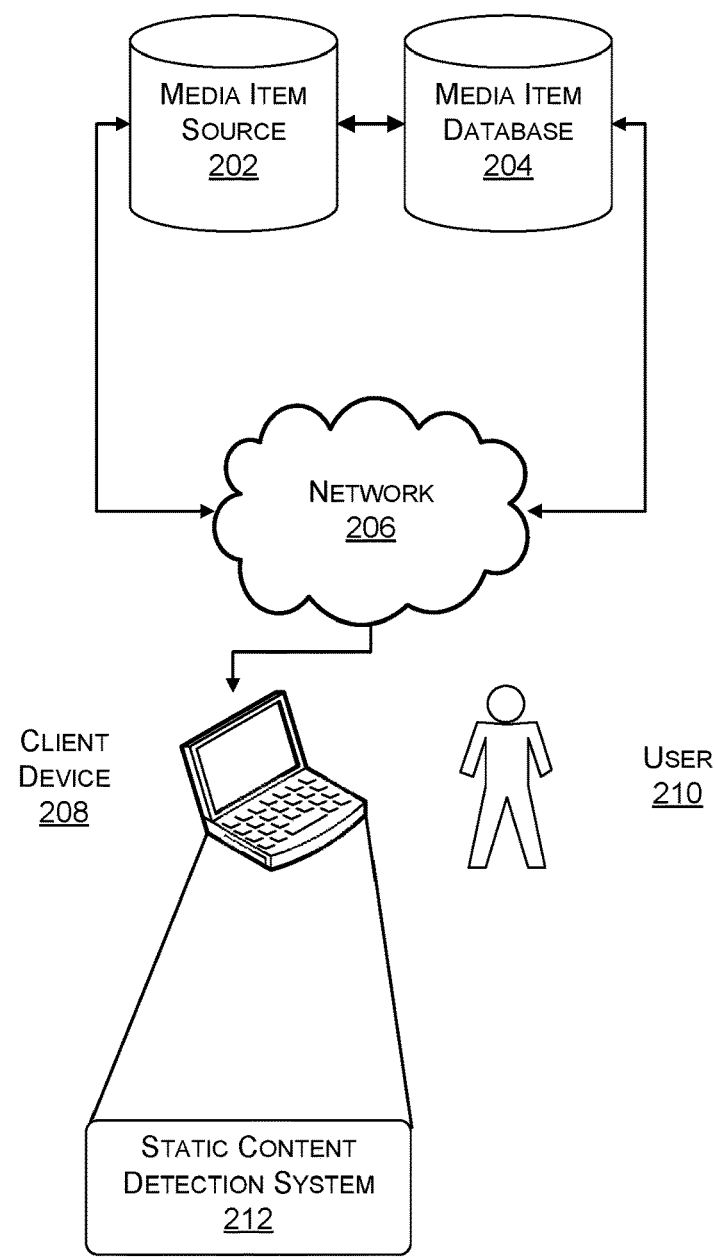
FIG. 2 is a system diagram of an illustrative environment that includes an illustrative static content detection system on a client device.

FIG. 2 is a system diagram of an illustrative environment 200 that includes a media item source 202, a media item database 204, a network 206, a client device 208, a user 210, and a static content detection system 212. The elements of FIG. 2 can be substantially similar to the elements of FIG. 1 that share the same name. As discussed above, environment 200 depicts an example environment where the static content detection system 212 can operate on the client device 208.

Figure 3:
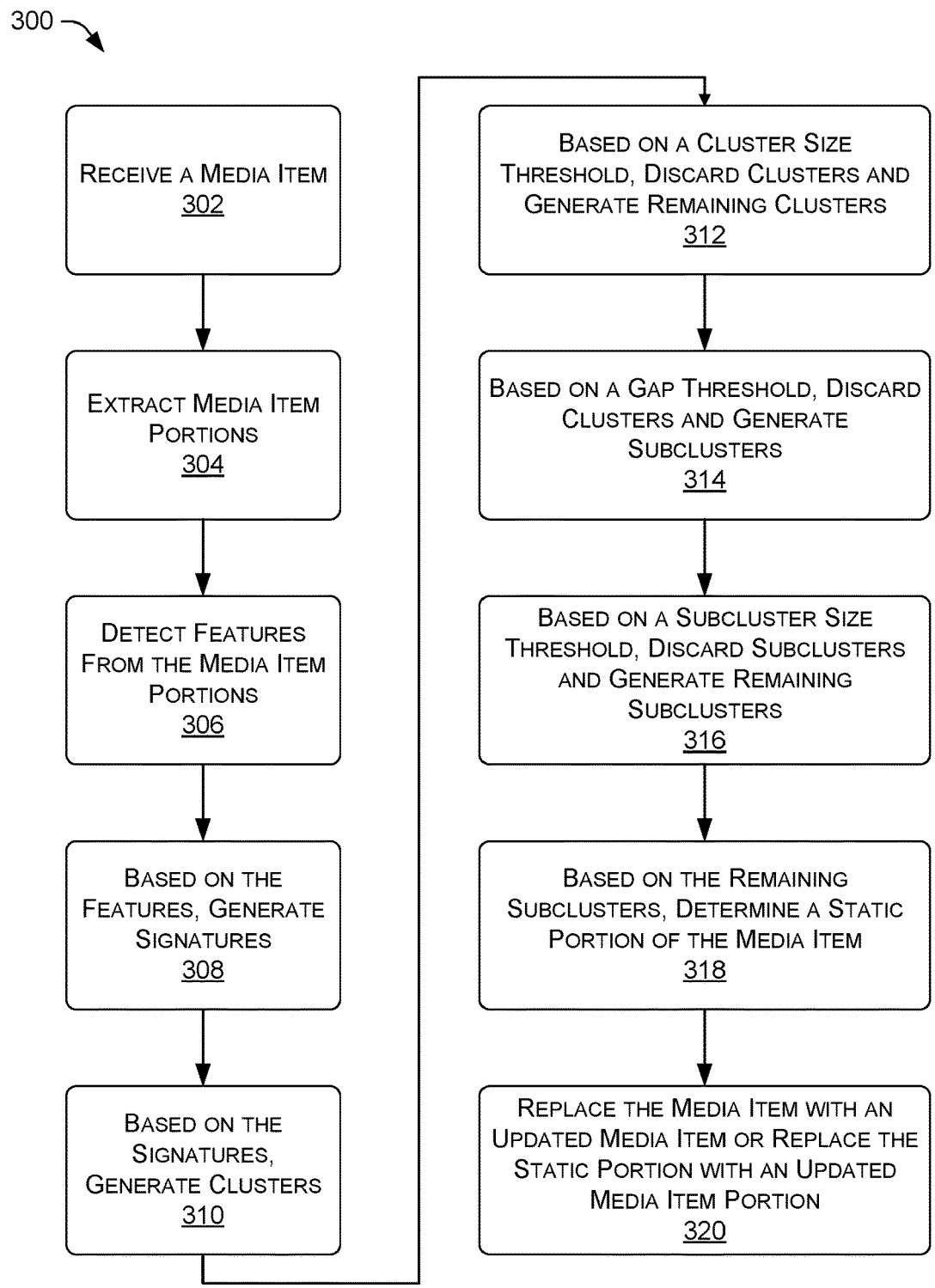
FIG. 3 is a flow diagram of an illustrative process to detect static content within a media item.

FIG. 3 is a flow diagram of an illustrative process 300 to detect and/or replace static content associated with a media item. The process 300 is described with reference to the environment 100 and the static content detection system 108. The process 300 can be performed in other similar and/or different environments. Additionally, some portions of process 300 can be omitted, replaced, and/or reordered while still providing the functionality of detecting and/or correcting static content.

At 302, the media input component 114 can access the media items stored in the media item source 102 and/or the media item database 104. For example, the media input component 114 can receive the media item. In some instances, the media input component 114 can retrieve the media item. In some instances, the media input component 114 can maintain and/or store the media item, such as in a database, datastore, data structure, and so on.

At 304, the portion extraction component 116 can extract media item portions from media items. For example, the portion extraction component 116 can extract image frames from a video. In some instances, the portion extraction component 116 can extract audio clips from an audio recording. In some instances, the portion extraction component 116 can extract photos from a slide show.

At 306, the feature detection component 118 can detect features from the media item portions. As discussed above, in some instances, the feature detection component can use the neural network component 120 to detect the features in the media item portions. In some instances, the features can be represented as numerical values.

At 308, the signature component 122 can use the features detected by the feature detection component 118 to generate signatures. As discussed above, a signature can be a concatenation of numerical values. In some instances, the signature can be a data structure comprising and/or derived from the features. In some instances, some or all of the media item portions can have an associated signature.

At 310, the clustering component 124 can cluster the media item portions based on, for example, a similarity threshold to generate clusters. As discussed above, the clustering component 124 can use signatures generated by the signature component 122 to perform comparisons of media item portions. In some instances, the clustering component 124 can compare the features of the media item portions without the use of the signatures.

At 312, the discarding component 126 can discard some or none of the clusters based on, for example, a cluster size threshold, to generate remaining clusters. For example, if none of the clusters meet or exceed a cluster size threshold, then the discarding component 126 will not discard any of the clusters. In some instances, the discarding component 126 can discard all of the clusters. In some instances, the discarding component 126 can discard some of the clusters.

At 314, the clustering component 124 can generate subclusters based on, for example, a gap threshold. As discussed above, for example, a cluster can contain sequential and/or nonsequential media item portions. Using the gap threshold, the clustering component 124 can split up the cluster to generate subclusters where the media item portions within the subclusters are sequential or substantially sequential according to a comparison with the gap threshold.

At 316, the discarding component 126 can discard some or none of the subclusters based on, for example, a subcluster size threshold, to generate remaining subclusters. For example, if none of the subclusters meet or exceed a cluster size threshold, then the discarding component 126 will not discard any of the subclusters. In some instances, the discarding component 126 can discard all of the clusters. In some instances, the discarding component 126 can discard some of the subclusters.

At 318, the static content identification component 128 can determine and/or detect a portion of the media item that is a static content portion.

At 320, the correction component 132 can replace the media item with an updated media item or replace the static portion of the media item with an updated media portion.

FIGS. 4-9 are pictorial diagrams of an illustrative process of detecting static content within a media item. This example will step through a portion of the process by which the static content is detected. The order in which the operations are described is not intended to be construed as a limitation, however.

Figure 4:
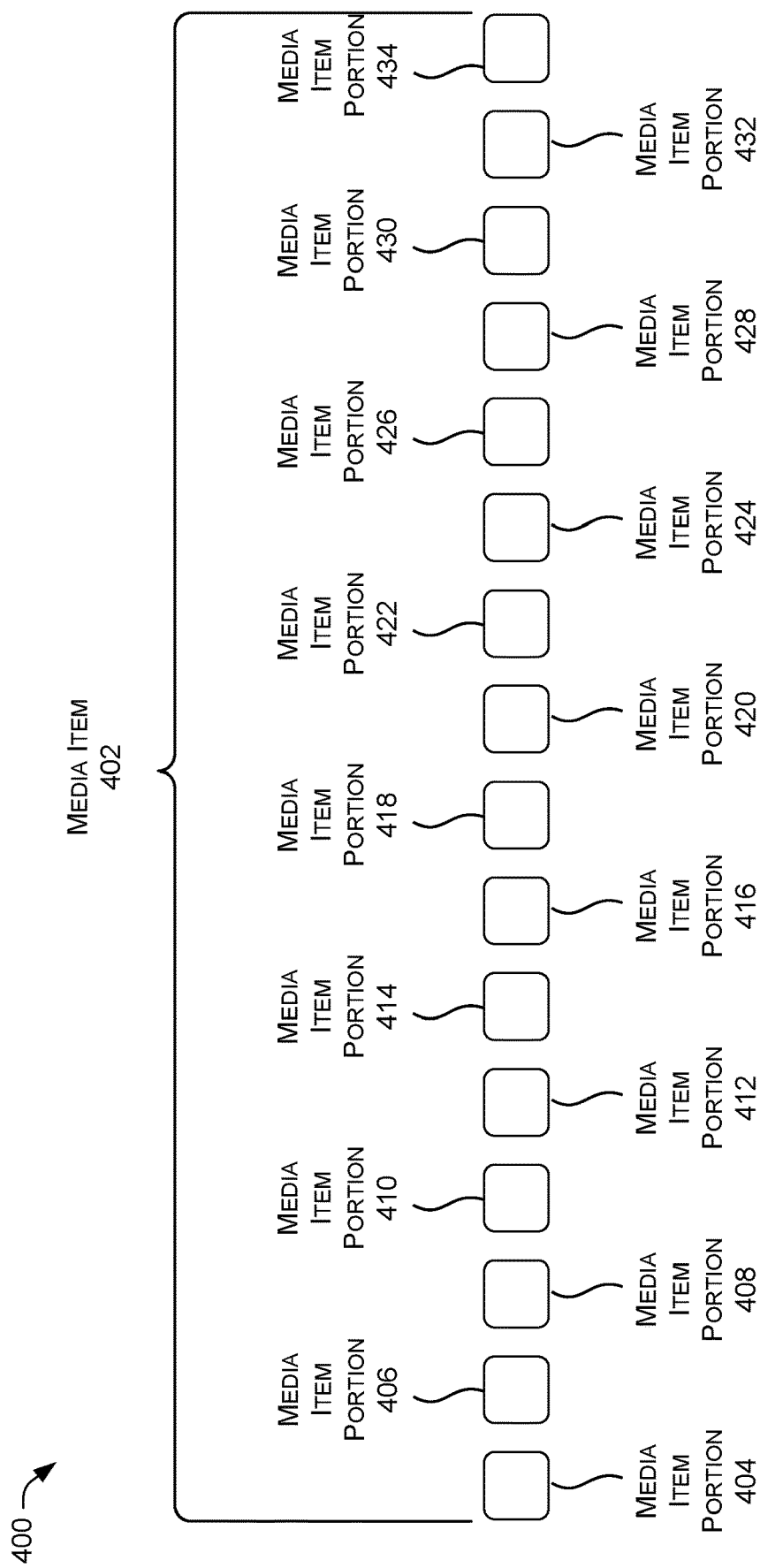
FIG. 4 is a pictorial diagram of an illustrative media item with media item portions.

FIG. 4 is a pictorial diagram 400 of a media item 402 and a set of media item portions 404-434. For example, media item 402 can represent a video and media item portions 404-434 can represent frames of the video. In some instances, the media item portions 404-434 can contain more than one frame. The media item 402 can also represent an audio recording and media item portions 404-434 can represent audio clips of the audio recording. At this stage, the portion extraction component 116, for example, has operated on the media item 402. While depicted as the entire media item 402 split into media item portions 404-434, in some instances, a section or a part of the media item 402 can be split into media item portions.

Figure 5:
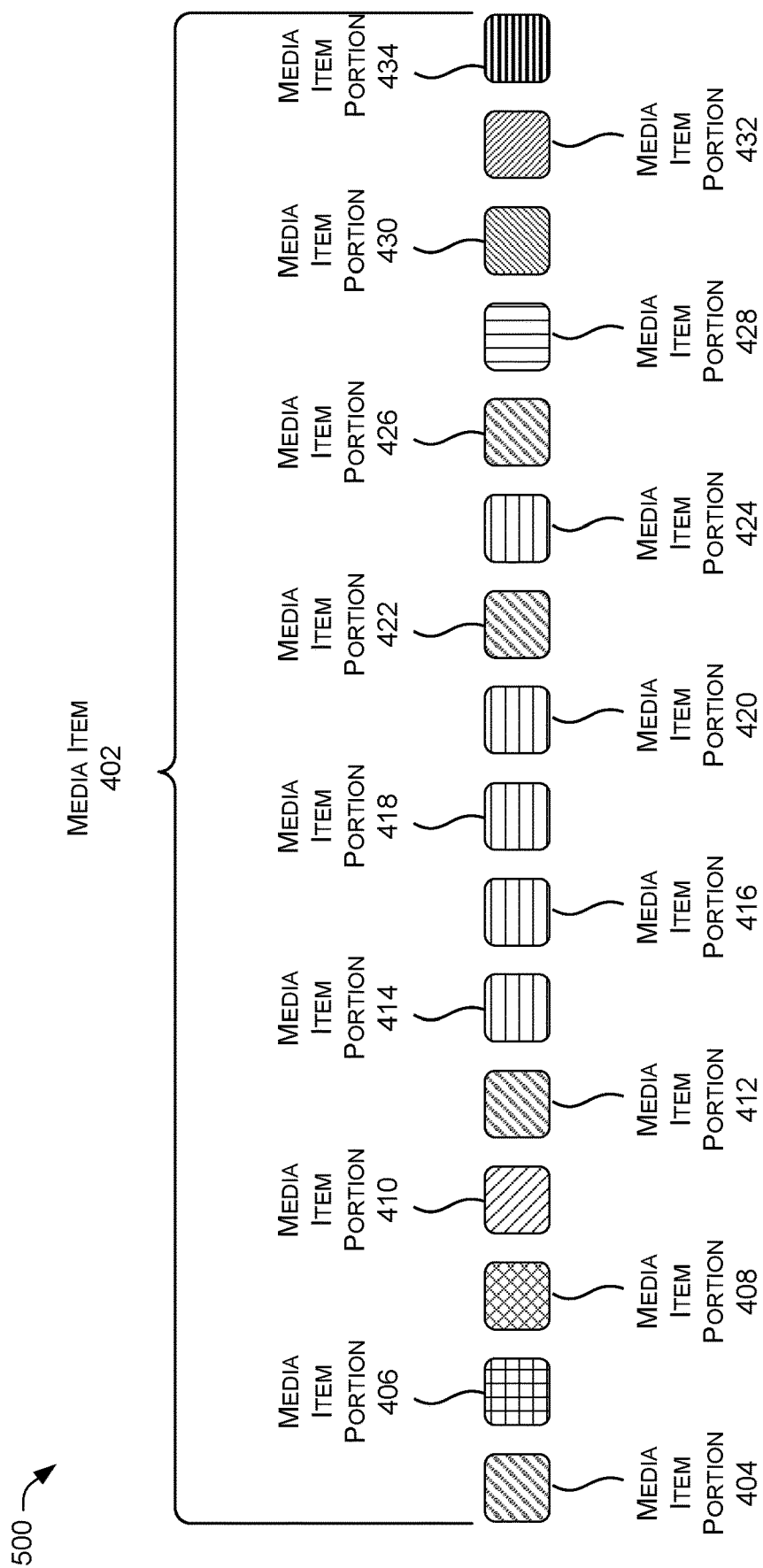
FIG. 5 is a pictorial diagram of the media item portions illustrated in FIG. 4 where, for illustrative purposes, signatures are represented as patterns and some of the media item portions share signatures or similar signatures represented as patterns.

FIG. 5 is a pictorial diagram 500 of the media item 402. At this stage, the feature detection component 118 has executed, as discussed above, to detect features in the media item portions. Using the features detected by the feature detection component 118, the signature component 122 can generate a signature based on, for example, the numerical values generated by the feature detection component 118. For purposes of illustration only, the patterns shown in FIG. 5 represent signatures associated with a media item portion. Some media item portions have signatures similar to other media item portions while other media item portions do not have a signature similar to some other media item portions. While depicted as all media item portions 404-434 as having a signature, in some instances, some media item portions do not have an associated signature.

Figure 6:
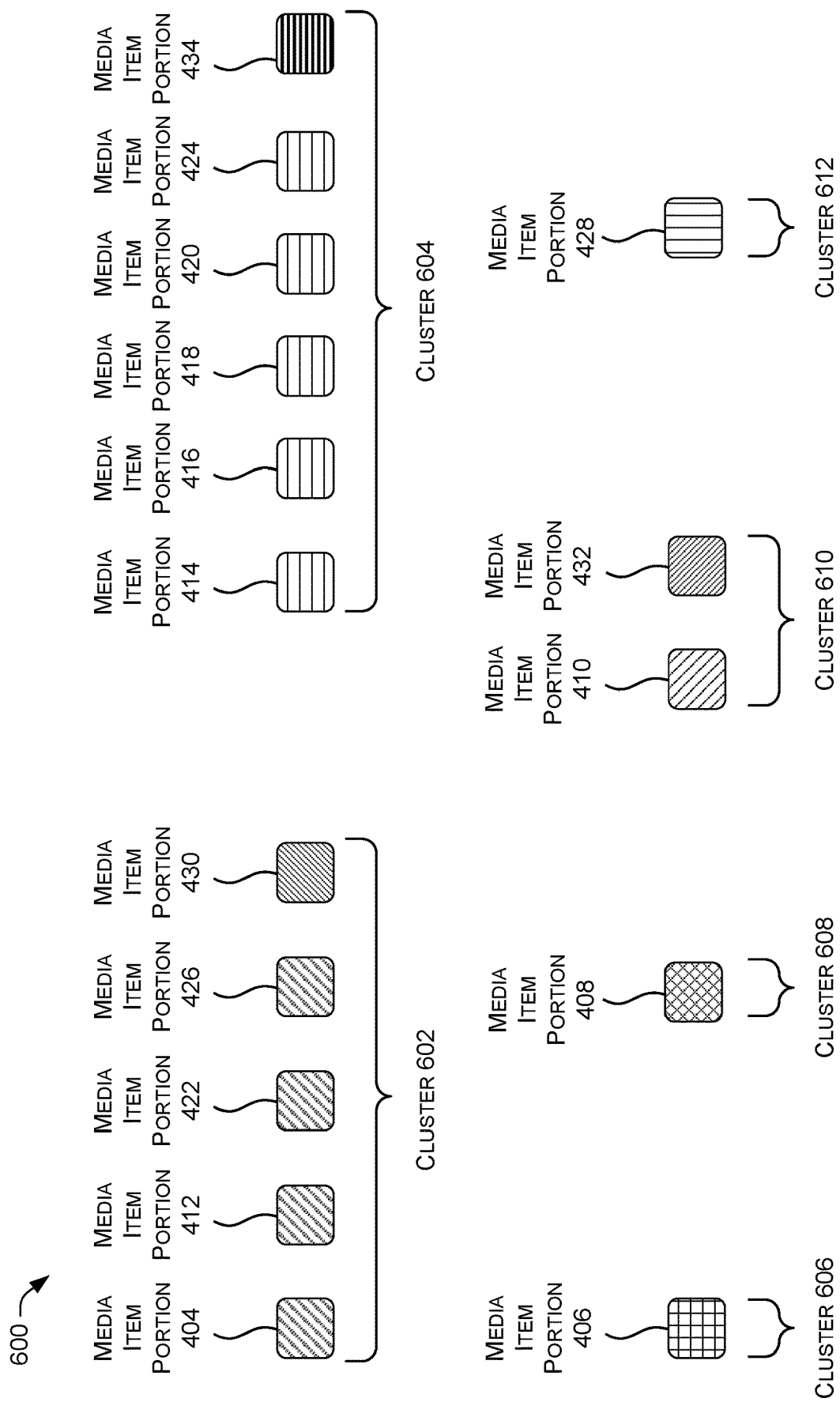
FIG. 6 is a pictorial diagram of the media item portions illustrated in FIGS. 4 and 5 where, for illustrative purposes, the media item portions that share signatures or similar signatures are associated with clusters.

FIG. 6 is a pictorial diagram 600 of the media item portions 404-434 associated with clusters 602-612. For example, after the clustering component 124 clusters the media item portions, based on signatures and/or features, clusters 602-612 can indicate which media item portions correspond with clusters. In some instances, the clustering component 124 uses the signatures generated by the signature component 122. The clustering component 124 can begin with a first signature and compare it with a second signature. The clustering component 124 can determine, based on the comparison and/or a similarity threshold, to either place the first media item portion associated with the first signature in the same cluster as the second media item portion associated with the second signature. This process can continue until some or all of the media item portions 404-434 have been clustered, such that each media item portion has been placed in its own cluster or within a cluster with one or more other media item portions. In pictorial diagram 600, media item portions 422 and 426 share similar or identical signatures. The media item portion 430 also shares a similar signature with media item portions 422 and 426 but it is not necessarily identical. For purposes of illustration only, this can indicate that the comparison between media item portion 430 and the other media item portions in cluster 602 did not meet or exceed the similarity threshold.

Figure 7:
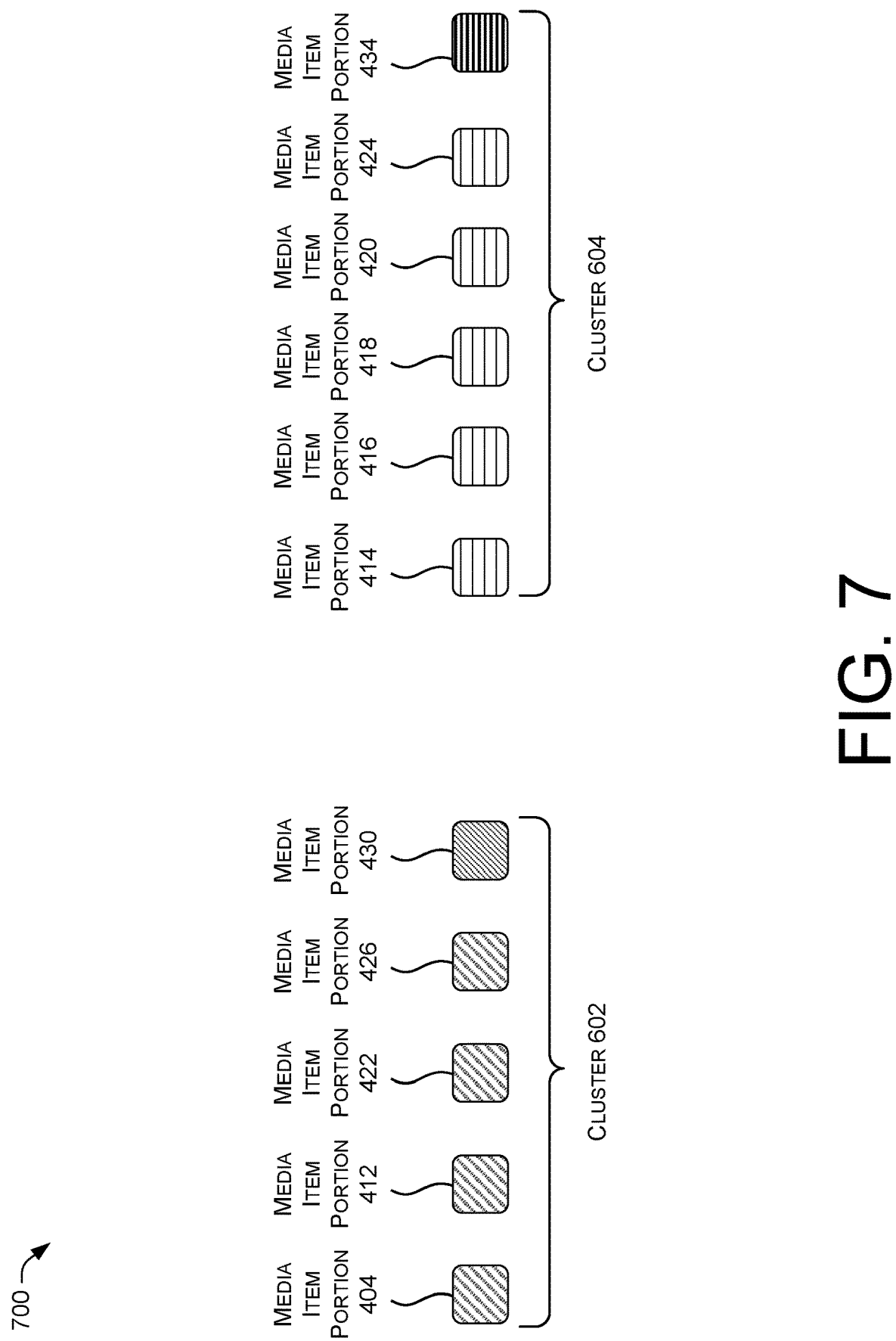
FIG. 7 is a pictorial diagram of the media item portions illustrated in FIGS. 3-6 and the clusters illustrated in FIG. 6 where, for illustrative purposes, only the clusters that meet or exceed a cluster size threshold are shown.

FIG. 7 is a pictorial diagram 700 of the remaining clusters 602 and 604. For example, after discarding component 126 operates on the clusters 602-612, it can discard clusters 606-612 based on, for example, a cluster size threshold. In this example, the cluster size threshold can be configured to be 4 media item portions. Therefore, the clusters that do not meet or exceed the cluster size threshold can be discarded (e.g., clusters 606-612).

Figure 8:
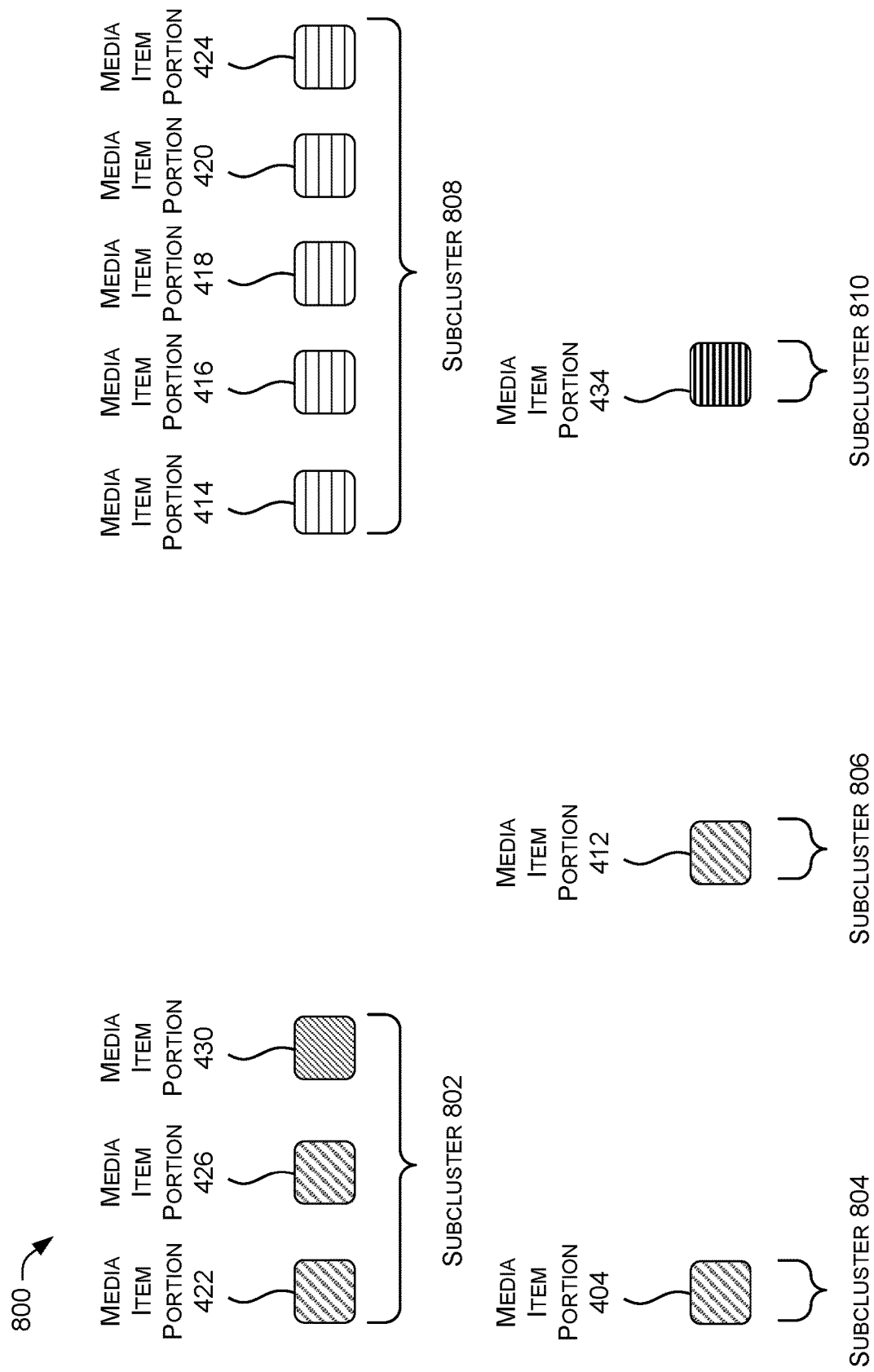
FIG. 8 is a pictorial diagram of the media item portions illustrated in FIGS. 3-7 where, for illustrative purposes, the media item portions that meet or exceed a gap threshold are associated with subclusters.

FIG. 8 is a pictorial diagram 800 of subclusters 802-810. For example, the clustering component 124 can operate on clusters 602 and 604 to generate subclusters 802-810. The clustering component 124 can use, for example, a configurable gap threshold to generate the subclusters 802-810. In this example, the gap threshold can be configured to be a gap of 6 media item portions. Therefore, the clustering component 124 can first operate on cluster 602 and determine, based on the gap threshold, that media item portion 404 does not meet or exceed the gap threshold of 6 media item portions and then splits it off into subcluster 802. Additionally, the clustering component 124 can determine that media item portion 412 also does not meet or exceed the gap threshold of 6 media item portions and then splits it off into subcluster 804. In some instances, the gap threshold can be based on an amount of time.

Figure 9:
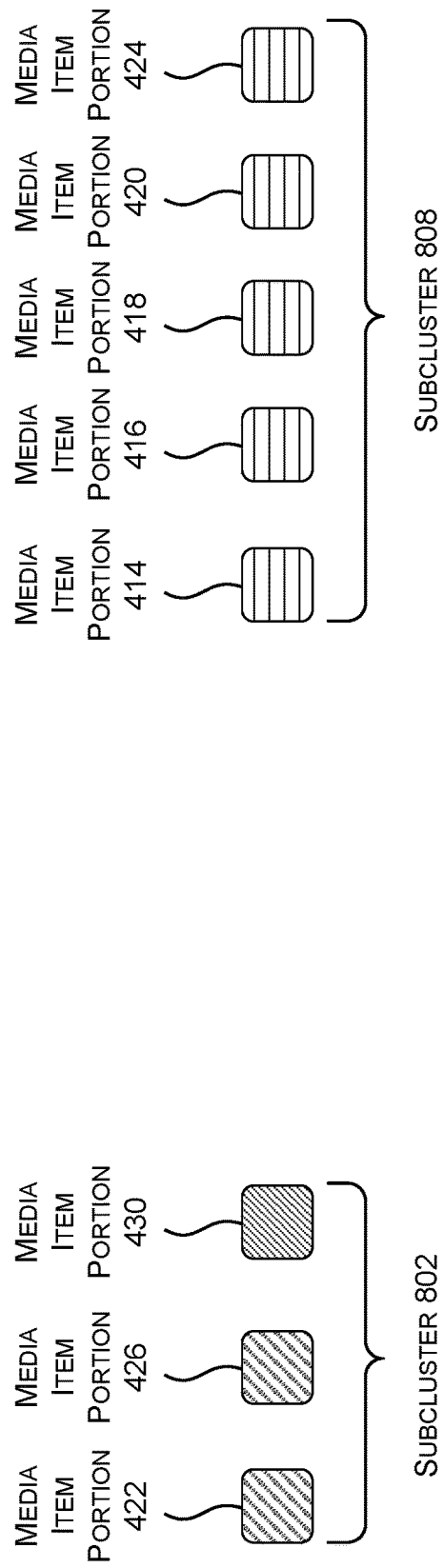
FIG. 9 is a pictorial diagram of the media item portions illustrated in FIGS. 3-8 and the subclusters illustrated in FIG. 8 where, for illustrative purposes, only the subclusters that meet or exceed a subcluster size threshold are shown.

FIG. 9 is a pictorial diagram 900 of remaining subclusters 802 and 808. For example, the discarding component 126 can operate on subclusters 802-810 to generate remaining subclusters 802 and 808 based on, for example, a subcluster size threshold. In this example, the subcluster size threshold can be configured to be 3 media item portions. Therefore, the discarding component 126 can determine that subclusters 804, 806, and 810 do not meet or exceed the subcluster size threshold because they do not contain or are not associated with at least 3 media item portions and then subclusters 802 and 808 can become the remaining subclusters. As discussed above, the static content identification component 128 can operate on the remaining subclusters to determine and/or detect the static content portion.

Figure 10:
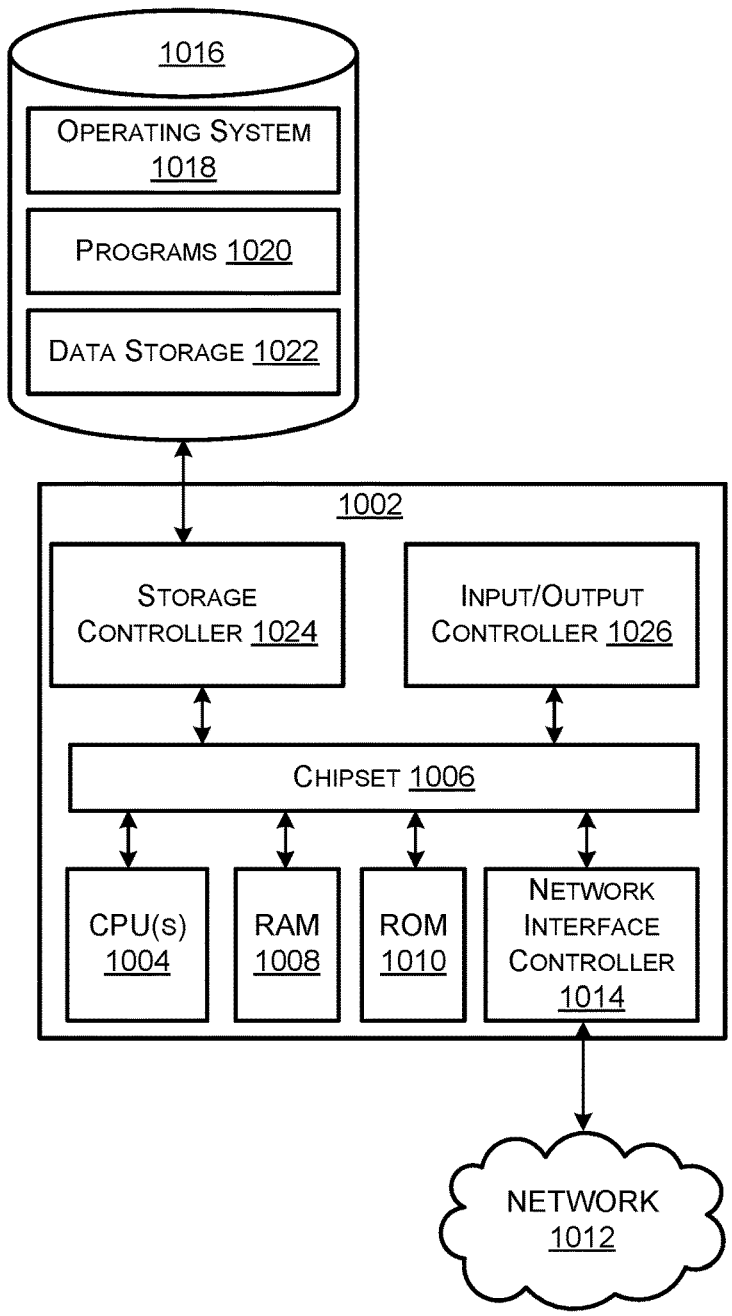
FIG. 10 is a computer architecture diagram showing an illustrative computer hardware architecture for implementing a computing device that can be utilized to implement aspects of the various technologies presented herein.

FIG. 10 is an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, wearable, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a network interface controller (NIC) 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1016 that provides non-volatile storage for the computer. The mass storage device 1016 can store an operating system 1018, programs 1020, and data storage 1022, which have been described in greater detail herein. The mass storage device 1016 can be connected to the computer 1000 through a storage controller 1024 connected to the chipset 1006. The mass storage device 1016 can consist of one or more physical storage units. The storage controller 1024 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1016 can store an operating system 1018 utilized to control the operation of the computer 1000. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In one configuration, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media for performing any of the other computer-implemented operations described herein.

The computer 1000 can also include one or more input/output controllers 1026 for receiving and processing input from a number of input devices, such as a keyboard, a mouse, a touchpad, a touch screen, an electronic stylus, or other type of input device. Similarly, an input/output controller 1026 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or can utilize an architecture completely different than that shown in FIG. 10.

Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and
   one or more computer-readable media storing computer-executable instructions that, when executed, cause the one or more processors to perform operations comprising:
   receiving, from a video database, a video;
   extracting, from the video, a plurality of frames;
   detecting, using a neural network and from the plurality of frames, features, wherein each feature of the features comprises at least one of color data, object data, audio frequency data, or text data, and is associated with an individual frame of the plurality of frames;
   generating signatures by concatenating a set of features of the features associated with a frame of the multiple frames;
   comparing, based on a similarity threshold, individual signatures of the one or more signatures to generate clusters, frames within the clusters having a first threshold level of similarity based on the similarity threshold;
   discarding individual clusters of the one or more clusters that are less than a cluster size threshold to generate one or more remaining clusters;
   generating, based on a gap threshold, one or more subclusters, wherein each subcluster of the one or more subclusters is associated with a remaining cluster of the one or more remaining clusters;
   discarding individual subclusters of the one or more subclusters that are less than a subcluster size threshold to generate one or more remaining subclusters;
   determining that a remaining subcluster of the one or more remaining subclusters includes multiple frames that each have a second threshold level of similarity and that are adjacent to one another; and
   determining, based on the remaining subcluster including the multiple frames that each have the second threshold level of similarity and that are adjacent to one another, that a portion of the video corresponding to the multiple frames is a static content portion.

2. The system as recited in claim 1, wherein the color data comprises at least one of a color or a set of colors that are greater than a color threshold, the object data comprises a likelihood of identifying a particular object, the audio frequency data comprises a frequency or a set of frequencies, and the text data comprises at least numerals or characters of a language.

3. The system as recited in claim 1, wherein the operations further comprise:

extracting a plurality of timestamps associated with the plurality of frames; and
arranging, based on the plurality of timestamps, a set of frames associated with an individual remaining cluster of the one or more remaining clusters,
wherein the gap threshold corresponds to at least one of an amount of time or a number of frames.

4. The system as recited in claim 1, wherein the operations further comprise:
determining a cause of the static content portion, wherein the cause comprises at least one of a content error that corresponds to a first error associated with content within the video or a playback error that corresponds to a second error associated with at least one of a transmission of the video or a viewer application that is rendering the video.

5. The system as recited in claim 1, wherein the operations further comprise:
sending, to a user device of a user that is consuming the video, an indication of the static content portion associated with the video; and
sending a request for at least one of an updated video to replace the video or an updated video portion to replace the static content portion.

6. A method comprising:
determining one or more media item portions of a media item;
detecting one or more features, wherein an individual feature of the one or more features is associated with a first media item portion of the one or more media item portions;
generating one or more signatures for the one or more media item portions, wherein an individual signature of the one or more signatures is associated with a second media item portion of the one or more media item portions;
comparing signatures of the one or more signatures to generate one or more clusters that each include at least one media item portion of the one or more media item portions;
generating one or more subclusters, wherein individual subclusters of the one or more subclusters are associated with a cluster of the one or more clusters;
determining that a subcluster of the one or more subclusters includes multiple media item portions that each have a threshold level of similarity and that are adjacent to one another; and
identifying, based at least in part on the subcluster including the multiple media item portions that each have the threshold level of similarity and that are adjacent to one another, a static content portion of the media item that corresponds to the multiple media item portions.

7. The method as recited in claim 6, wherein the media item comprises at least one of a video, an audio recording, or a set of images.

8. The method as recited in claim 6, wherein the determining the one or more media item portions comprises extracting the one or more media item portions according to at least one of a fixed time interval or a variable time interval.

9. The method as recited in claim 6, wherein the one or more features comprise at least one of: color data comprising a color or a set of colors that are greater than a color threshold, object data comprising a likelihood of identifying a particular object, audio frequency data comprising a frequency or a set of frequencies, or text data comprising numerals or characters of a language.

10. The method as recited in claim 6, further comprising:
receiving, from a media source and at a media item database, the media item, wherein the media source comprises at least one of a content creator, a studio, a producer, a network or a distributor associated with the media item.

11. The method as recited in claim 6 further comprising:
determining that a user is consuming the media item at a time at which the static content portion is identified;
determining at least one of an updated media item or an updated media item portion; and
at least one of:
replacing the media item with the updated media item; or
replacing the static content portion with the updated media item portion.

12. The method as recited in claim 11, further comprising:
sending, to a user device of the user, an indication of the static content portion, the indication further indicating that the media item is to be replaced with the updated media item or that the static content portion is to be replaced with the updated media item portion.

13. The method as recited in claim 6, further comprising:
determining that a user is consuming the media item prior to a time at which the static content portion is identified;
determining at least one of an updated media item or an updated media item portion; and
prior to the user consuming the media item at the time, at least one of:
replacing the media item with the updated media item; or
replacing the static content portion with the updated media item portion.

14. A system comprising:
one or more processors; and
one or more computer-readable media storing computer-executable instructions that, when executed, cause the one or more processors to perform operations comprising:
determining one or more media item portions of a media item;
detecting one or more features, wherein an individual feature of the one or more features is associated with a first media item portion of the one or more media item portions;
generating one or more signatures, wherein an individual signature of the one or more signatures is associated with a second media item portion of the one or more media item portions;
comparing signatures of the one or more signatures to generate one or more clusters;
determining that a cluster of the one or more clusters includes multiple media item portions that each have a threshold level of similarity and that are adjacent to one another; and
identifying, based at least in part on the cluster including the multiple media item portions that each have the threshold level of similarity and that are adjacent to one another, a static content portion of the media item that corresponds to the multiple media item portions.

15. The system as recited in claim 14, wherein the operations further comprise:
sequencing a set of media item portions of the one or more media item portions associated with a second cluster of the one or more clusters; and based at least in part on a gap threshold, discarding at least a third media item portion of the one or more media item portions associated with the second cluster, wherein the gap threshold indicates at least one of an amount of time or a number of media item portions.

16. The system as recited in claim 14, wherein the one or more features comprise at least one of: color data comprising a color or a set of colors that are greater than a color threshold, object data comprising a likelihood of identifying a particular object, audio frequency data comprising a frequency or a set of frequencies, or text data comprising numerals or characters of a language.

17. The system as recited in claim 14, wherein the operations further comprise:
 determining a cause of the static content portion, wherein the cause comprises at least one of a content error that corresponds to a first error associated with content within the media item or a playback error that corresponds to a second error with at least one of a transmission of the media item or an application that is outputting the media item.

18. The system as recited in claim 14, wherein the operations further comprise:
 sending, to a user device of a user that is consuming the media item, an indication of the static content portion associated with the media item; and
 sending a request for at least one of an updated media item to replace the media item or an updated media item portion to replace the static content portion.

19. The system as recited in claim 14, wherein the operations further comprise:
 determining that a user is consuming the media item;
 determining at least one of an updated media item or an updated media item portion; and
 at least one of:
  replacing the media item with the updated media item; or
  replacing the static content portion with the updated media item portion.

20. The method as recited in claim 19, further comprising:
 sending, to a user device of the user, an indication of the static content portion, the indication further indicating that the media item is to be replaced with the updated media item or that the static content portions is to be replaced with the updated media item portion.

* * * * *